United States Patent
Sugae et al.

(10) Patent No.: US 11,150,343 B2
(45) Date of Patent: Oct. 19, 2021

(54) OBJECT DETECTION SYSTEM AND OBJECT DETECTION APPARATUS

(71) Applicant: AISIN SEIKI KABUSHIKI KAISHA, Kariya (JP)

(72) Inventors: Ippei Sugae, Kariya (JP); Hisashi Inaba, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 31 days.

(21) Appl. No.: 16/725,175

(22) Filed: Dec. 23, 2019

(65) Prior Publication Data

US 2020/0217953 A1 Jul. 9, 2020

(30) Foreign Application Priority Data

Jan. 8, 2019 (JP) .............................. JP2019-001420

(51) Int. Cl.
| | |
|---|---|
| *G01S 15/04* | (2006.01) |
| *G01S 15/08* | (2006.01) |
| *G01S 15/931* | (2020.01) |
| *G01S 7/539* | (2006.01) |

(52) U.S. Cl.
CPC .............. *G01S 15/04* (2013.01); *G01S 7/539* (2013.01); *G01S 15/08* (2013.01); *G01S 15/931* (2013.01)

(58) Field of Classification Search
CPC .......... G01S 15/04; G01S 7/539; G01S 15/08; G01S 15/931
See application file for complete search history.

(56) References Cited

U.S. PATENT DOCUMENTS

| | | | | |
|---|---|---|---|---|
| 7,376,493 | B2 * | 5/2008 | Takeichi | G01S 7/523 340/903 |
| 7,496,157 | B2 | 2/2009 | Katou et al. | |
| 2009/0279389 | A1 * | 11/2009 | Irie | H04B 11/00 367/118 |
| 2012/0166042 | A1 * | 6/2012 | Kokido | B60Q 5/008 701/36 |
| 2013/0093583 | A1 * | 4/2013 | Shapiro | G01S 15/931 340/436 |
| 2014/0331772 | A1 * | 11/2014 | Klotz | G01S 15/931 73/602 |
| 2016/0084958 | A1 * | 3/2016 | Kim | G01S 15/102 367/96 |
| 2018/0067207 | A1 * | 3/2018 | Bang | G01S 15/102 |

FOREIGN PATENT DOCUMENTS

JP 2005-249770 A 9/2005

* cited by examiner

*Primary Examiner* — Thomas D Alunkal
(74) *Attorney, Agent, or Firm* — Sughrue Mion, PLLC

(57) ABSTRACT

An object detection system includes plural first object detection apparatuses each including a transmitting portion configured to transmit a first wave motion of a first frequency included in plural first frequencies, the transmitting portion transmitting the first wave motion of the first frequency which is different from the other first object detection apparatus concurrently with the other first object detection apparatus. The system includes a receiving portion configured to receive a reception wave, a determination portion configured to determine a correspondence relationship between one or more second frequency of one or more second wave motion included in the reception wave and the plural first frequencies, and a detection portion configured to detect information related to the object.

8 Claims, 8 Drawing Sheets

OBJECT DETECTION SYSTEM AND OBJECT DETECTION APPARATUS

CROSS REFERENCE TO RELATED APPLICATIONS

This application is based on and claims priority under 35 U.S.C. § 119 to Japanese Patent Application 2019-001420, filed on Jan. 8, 2019, the entire content of which is incorporated herein by reference.

TECHNICAL FIELD

This disclosure generally relates to an object detection system and an object detection apparatus.

BACKGROUND DISCUSSION

In a known technique, a correlation value between a transmission wave and a reception wave serving as the transmission wave that has been reflected by an object and then returned is obtained (calculated), determination is made whether or not a degree of similarity of the transmission wave and the reception wave to each other is at a level which is equal to or greater than a predetermined level on the basis of the correlation value, and a distance to the object which is one of information related to the object is detected in, for example, TOF (Time Of Flight) method on the basis of the detection result (for example, JP2005-249770A which will be referred also to Patent reference 1).

In the above-described known technique, a system may be realized which includes plural object detection apparatuses for detecting the information related to the object. In such a system, to detect the information related to the object in more detail, each of the plural object detection apparatuses needs to transmit the transmission wave substantially concurrently (concurrently and parallelly). In this case, it is ideal that a sender or a source of the transmission wave that returned as the reception wave is determined in a simple manner.

A need thus exists for an object detection system and an object detection apparatus which are not susceptible to the drawback mentioned above.

SUMMARY

According to an aspect of this disclosure, an object detection system includes plural first object detection apparatuses. Each of the plural first object detection apparatuses includes a transmitting portion configured to transmit, as a transmission wave, a first wave motion of a first frequency included in plural first frequencies set within a range of a predetermined frequency band. The transmitting portion transmits the first wave motion of the first frequency which is different from the other first object detection apparatus concurrently with the other first object detection apparatus. Each of the plural first object detection apparatuses includes a receiving portion configured to receive a reception wave that is based on the transmission wave returned due to reflection at an object, and a determination portion configured to determine a correspondence relationship between one or more second frequency of one or more second wave motion included in the reception wave and the plurality of first frequencies, on the basis of a result of a frequency analysis of the reception wave and information related to the plural first frequencies. Each of the plural first object detection apparatuses includes a detection portion configured to detect information related to the object on the basis of information obtained according to a determination result of the determination portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of the present disclosure will be described with reference to the drawings. The configuration of the embodiment described hereafter, and the operations and results (advantages and effects) brought by the configuration are examples, and the present disclosure is not limited thereto.

Figure 1:
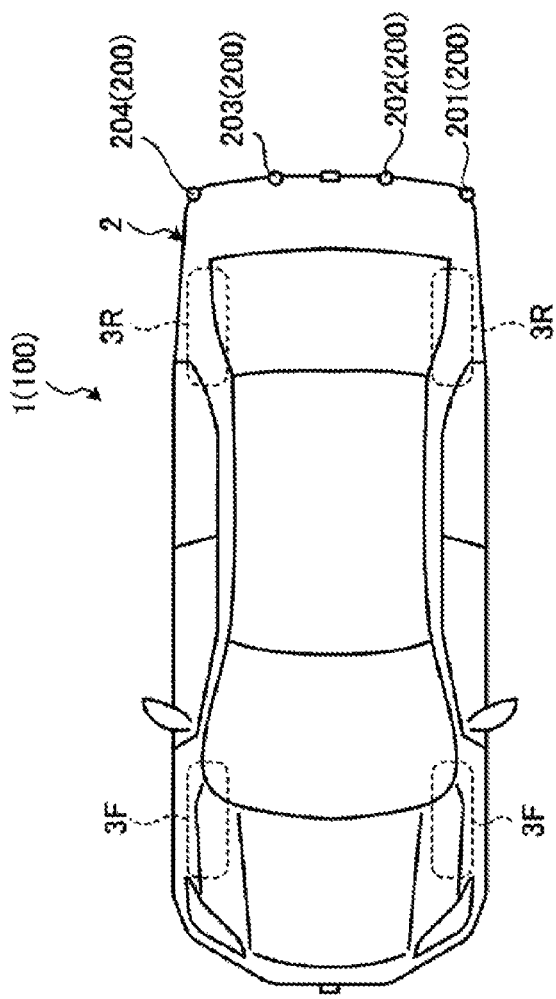
FIG. 1 is a schematic view, seen from above, illustrating an exterior of a vehicle provided with an object detection system according to an embodiment disclosed here.

FIG. 1 is a schematic example view, seen from above, illustrating an exterior of a vehicle provided with an object detection system according to the embodiment. As will be described in detail later, the object detection system according to the embodiment is an on-vehicle sensor system that performs transmission and reception of ultrasonic waves and obtains, for example, a time difference between the transmission and the reception, and thereby detecting information related to an object including a human or person in the surroundings (for example, an obstacle O illustrated in FIG. 2 which will be described later).

As illustrated in FIG. 1, the object detection system includes an ECU (Electronic Control Unit) 100 provided inside the vehicle 1, and distance detection apparatuses 201, 202, 203, 204 provided at an exterior of the vehicle 1. The vehicle 1 is provided with four wheels including a pair of front wheels 3F and a pair of rear wheels 3R. The distance detection apparatuses 201, 202, 203, 204 are examples of "object detection apparatuses"

As an example, in the example illustrated in FIG. 1, the distance detection apparatuses 201 to 204 are provided at, for example, a rear bumper at a rear end of a vehicle body 2 serving as the exterior of the vehicle 1, so as to be arranged at different positions from one another.

In the embodiment, hardware configurations and functions of the respective distance detection apparatuses 201, 202, 203, 204 are identical to one another. Therefore, for the purpose of simplification, the distance detection apparatuses 201, 202, 203, 204 will be collectively referred to also as the distance detection apparatus 200 hereunder.

In the embodiment, the position where the distance detection apparatus 200 is arranged is not limited to the example illustrated in FIG. 1. For example, the distance detection apparatus 200 may be provided at a front bumper of a front end of the vehicle body 2, at a side surface or side surfaces of the vehicle body 2, or at two or more positions of the rear bumper, the front bumper and the side surfaces. In the embodiment, the number of the distance detection apparatus 200 is not limited to the example illustrated in FIG. 1. The technique of the embodiment is applicable and effective to a configuration at which plural of the distance detection apparatuses 200 are provided.

Figure 2:
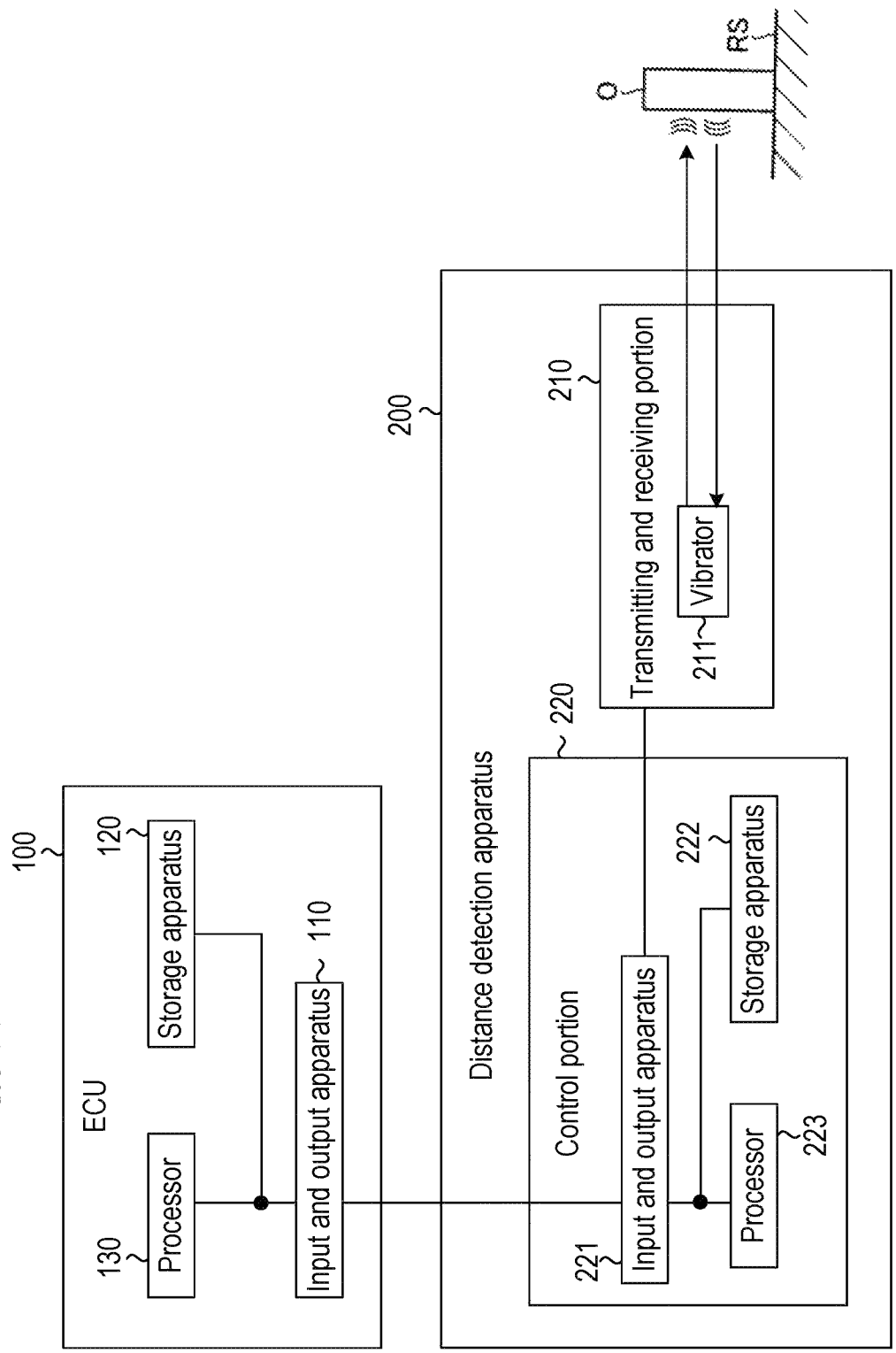
FIG. 2 is a schematic block diagram illustrating a schematic hardware configuration of an ECU (Electronic Control Unit) and a distance detection apparatus, according to the embodiment.

FIG. 2 is a schematic example block diagram illustrating a hardware configuration of the ECU 100 and the distance detection apparatus 200, according to the embodiment.

As illustrated in FIG. 2, the ECU 100 includes the hardware configuration that is similar to a usual computer. More specifically, the ECU 100 includes an input and output apparatus 110, a storage apparatus 120 and a processor 130.

The input and output apparatus 110 is an interface for realizing transmission and reception of information between the ECU 100 and an outside (the distance detection apparatus 200 in the example of FIG. 1).

The storage apparatus 120 includes a main storage including ROM (Read Only Memory) and/or RAM (Random Access Memory), and/or an auxiliary storage including an HDD (Hard Disk Drive) and/or an SSD (Solid State Drive), for example.

The processor 130 controls various processing executed in the ECU 100. The processor 130 includes an arithmetic apparatus including a CPU (Central Processing Unit), for example. For example, the processor 130 realizes various functions including autonomous or automatic parking by reading computer program stored in the storage apparatus 120 and performing the computer program.

As illustrated in FIG. 2, the distance detection apparatus 200 includes a transmitting and receiving portion 210 and a control portion 220.

The transmitting and receiving portion 210 includes a vibrator 211 including, for example, a piezoelectric element, and realizes the transmission and reception of the ultrasonic waves with the use of the vibrator 211.

More specifically, the transmitting and receiving portion 210 transmits, as a transmission wave, an ultrasonic wave generated in response to vibrations of the vibrator 211. Then, the transmitting and receiving portion 210 receives, as a reception wave, vibrations of the vibrator 211, the vibrations which are caused in a manner that the ultrasonic wave transmitted as the transmission wave is reflected by an object existing in the outside and the reflected wave returns. In the example of FIG. 2, the obstacle O arranged on a road surface RS is illustrated as the object that reflects the ultrasonic wave from the transmitting and receiving portion 210.

According to the configuration of the example illustrated in FIG. 2, both the transmission of the transmission wave and the reception of the reception wave are realized or performed by the single transmitting and receiving portion 210 provided with the single vibrator 211. However, the technique of the embodiment is also applicable to a configuration in which a configuration of a transmitting-side and a configuration of a receiving-side are separated from each other, including a configuration in which a first vibrator for transmitting the transmission wave and a second vibrator for receiving the reception wave are provided separately from each other, for example.

The control portion 220 includes a hardware configuration that is similar to a usual computer. More specifically, the control portion 220 includes an input and output apparatus 221, a storage apparatus 222 and a processor 223.

The input and output apparatus 221 is an interface for realizing transmission and reception of information between the control portion 220 and an outside (the ECU 100 and the transmitting and receiving portion 210 in the example of FIG. 1).

The storage apparatus 222 includes a main storage including ROM and/or RAM, and/or an auxiliary storage including an HDD and/or an SSD, for example.

The processor 223 controls various processing executed in the control portion 220. The processor 223 includes an arithmetic apparatus including a CPU, for example. For example, the processor 223 realizes various functions by reading computer program stored in the storage apparatus 222 and then performing the computer program.

The distance detection apparatus 200 of the embodiment detects a distance from the distance detection apparatus 200 to the object with the use of the technique of so-called TOF (Time Of Flight) method. As will be described in detail below, the TOF method is the technique that a distance to an object is calculated in consideration of a difference between a timing at which a transmission wave was transmitted (more specifically, a timing at which the transmission of the transmission wave was started) and a timing at which a reception wave was received (more specifically, a timing at which the reception of the reception wave was started).

Figure 3:
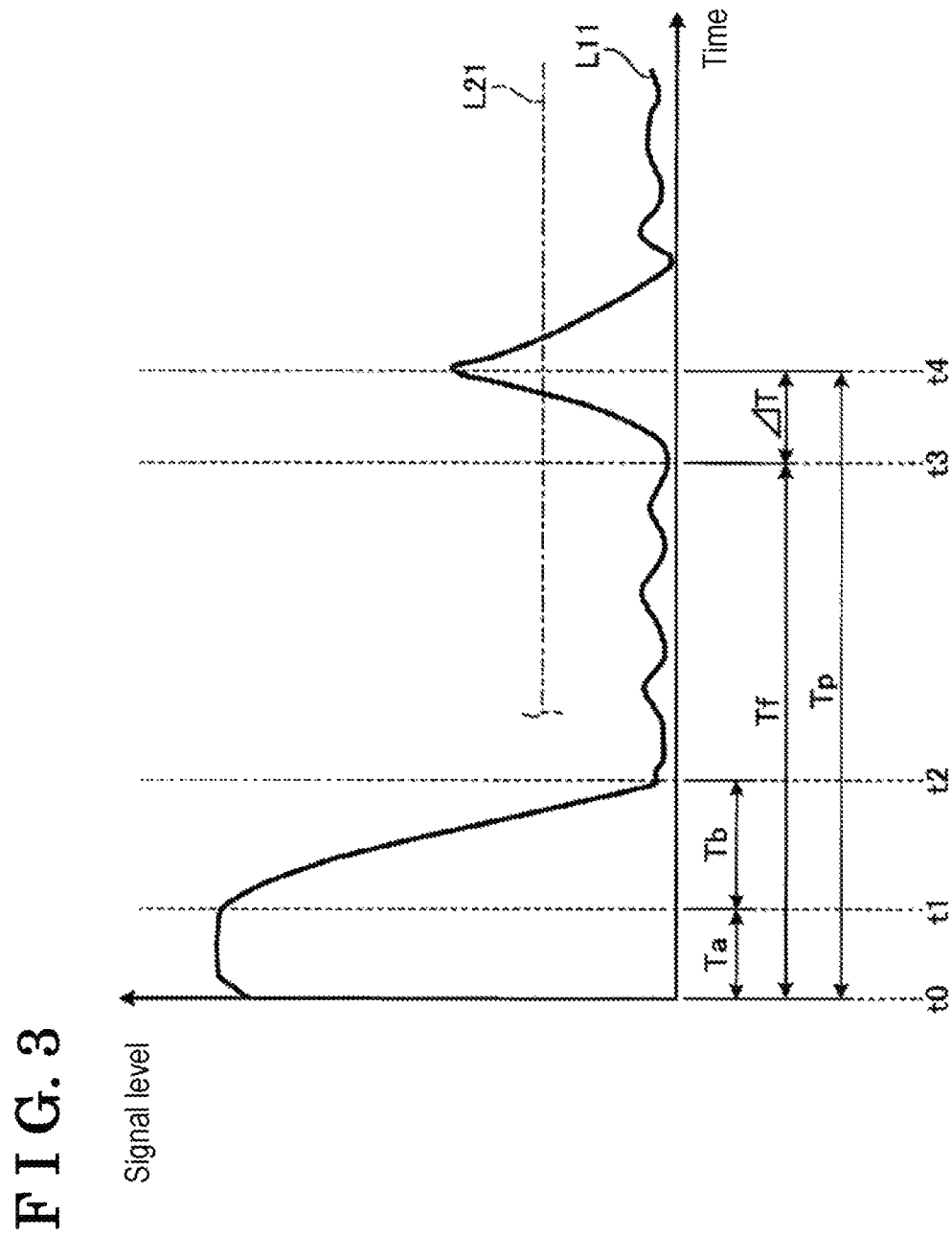
FIG. 3 is a schematic view for explaining an outline of a technique used by the distance detection apparatus according to the embodiment for detecting a distance to an object.

FIG. 3 is a schematic example view for explaining an outline of a technique used by the distance detection apparatus 200 to detect the distance to the object, according to the embodiment. More specifically, FIG. 3 is a view schematically illustrating, in a graphic form, a time change of a signal level (amplitude, for example) of the ultrasonic wave transmitted and received by the distance detection apparatus 200 of the embodiment. In the graph illustrated in FIG. 3, the horizontal axis corresponds to the time and the vertical axis corresponds to the signal level of the signal transmitted and received by the distance detection apparatus 200 via the transmitting and receiving portion 210 (the vibrator 211).

In the graph illustrated in FIG. 3, a solid line L11 indicates an example of the signal level of the signal that the distance detection apparatus 200 transmits or receives, that is, an envelope curve indicating the time change (the change over time) of a degree of vibration of the vibrator 211. It can be read from the solid line L11 that the vibrator 211 is driven and vibrates from a timing t0 for a time Ta and thus the transmission of the transmission wave is completed at a timing t1, and thereafter, the vibrator 211 keeps vibrating due to inertia for a time Tb until reaching a timing t2 while the vibration becomes attenuated or damped. Accordingly, in the graph illustrated in FIG. 3, the time Tb corresponds to so-called reverberation time.

The solid line L11 comes to a peak at a timing t4 when a time Tp has passed since the transmission of the transmission wave started at the timing t0. At the peak, the degree of vibration of the vibrator 211 exceeds (or, equals to or greater than) a predetermined threshold value Th1 indicated by an alternate long and short dash line L21. The predetermined threshold value Th1 is a value set in advance to identify or distinguish whether the vibration of the vibrator 211 results from the reception of the reception wave corresponding to the transmission wave that has been reflected by a detection target object (the object which is a target of the detection, including, the obstacle O illustrated in FIG. 2, for example) and then has returned, or the vibration of the vibrator 211 results from the reception of the reception wave corresponding to the transmission wave that has been reflected by the object which is other than the detection target object (the road surface RS illustrated in FIG. 2, for example) and then has returned.

FIG. 3 illustrates an example where the predetermined threshold value Th1 is set as a constant value that does not change or vary with time, however, the predetermined threshold value Th1 may be set as a value that changes with time in the embodiment.

Here, it can be regarded that the vibration of which the peak exceeds (or, is equal to or greater than) the predetermined threshold value Th1 results from the reception of the reception wave corresponding to the transmission wave that has been reflected by the object which is the target of the detection and then returned. On the other hand, it can be regarded that the vibration of which the peak is equal to or less than (or, is less than) the predetermined threshold value Th1 results from the reception of the reception wave corresponding to the transmission wave that has been reflected by the object which is other than the target of the detection and then returned.

Consequently, it can be read from the solid line L11 that the vibration of the vibrator 211 at the timing t4 is caused by the reception of the reception wave corresponding to the transmission wave that has been reflected by the detection target object and then returned.

According to the solid line L11, the vibration of the vibrator 211 is attenuated at and after the timing t4. Thus, the timing t4 corresponds to a timing at which the reception of the reception wave serving as the transmission wave that has been reflected by the detection target object and returned is completed, in other words, the timing t4 corresponds to a timing at which the last transmission wave that was transmitted lastly at the timing t1 returns as the reception wave.

According to the solid line L11, a timing t3 serving as a start point of the peak of the timing t4 corresponds to a timing at which the reception of the reception wave corresponding to the transmission wave that has been reflected by the detection target object and then returned is started, in other words, the timing t3 corresponds to a timing at which the first transmission wave that was firstly transmitted at the timing t0 returns as the reception wave. Consequently, according to the solid line L11, a time $\Delta T$ from the timing t3 to the timing t4 is equal to the time Ta serving as a transmission time of the transmission wave.

In the light of the above description, in order to obtain the distance to the object that is the target of the detection with the use of the TOF method, a time Tf from the timing t0 at which the transmission wave started being transmitted and the timing t3 at which the reception wave started being received needs to be obtained. The time Tf may be obtained by subtracting the time $\Delta T$ that equals to the time Ta corresponding to the transmission time of the transmission wave, from the time Tp corresponding to a difference between the timing t0 and the timing t4 at which the signal level of the reception wave comes to the peak exceeding the threshold value Th1.

The timing t0 at which the transmission wave starts being transmitted is easily identified as a timing at which the distance detection apparatus 200 started operating. The time Ta corresponding to the transmission time of the transmission wave is predetermined by, for example, setting in advance. Accordingly, for obtaining the distance to the object of the detection target by the TOF method, it is important to identify the timing t4 at which the signal level of the reception wave reaches the peak exceeding the threshold value Th1.

In the configuration in which the plural distance detection apparatuses 200 are provided as in the above-described embodiment, each of the plural distance detection apparatuses 200 needs to transmit the transmission wave substantially concurrently (concurrently and parallelly) with each other or one another in order to detect the information related to the object existing in the surroundings in more detail. In this case, it is desirable that a source or sender of the transmission wave that returned as the reception wave is determined in a simple method.

One conceivable method of determining the source or transmitter of the transmission wave that returned as the reception wave may be a method in which each of the plural distance detection apparatuses 200 transmits, as the transmission wave, a coded signal coded to include identification information in such a manner that the distance detection apparatus 200 includes the identification information that is different from the identification information of other distance detection apparatuses 200. According to the above-described method, a code length of the identification information needs to be long depending on the number of the distance detection apparatuses 200 in order that all of the plural distance detection apparatuses 200 are identified from each other or one another. However, the longer the code length of the identification information becomes, the longer the transmission time of the transmission wave becomes. Accordingly, rapidity or quickness that is generally required in detecting the information related to the object existing in a short distance may be deteriorated or reduced.

In the embodiment, the source of the transmission wave that returned as the reception wave is determined in a simple manner (and the rapidity in the detection of the information related to the object existing in a short distance is assured), by configuring each of the plural distance detection apparatus 200 as will be described below.

Figure 4:
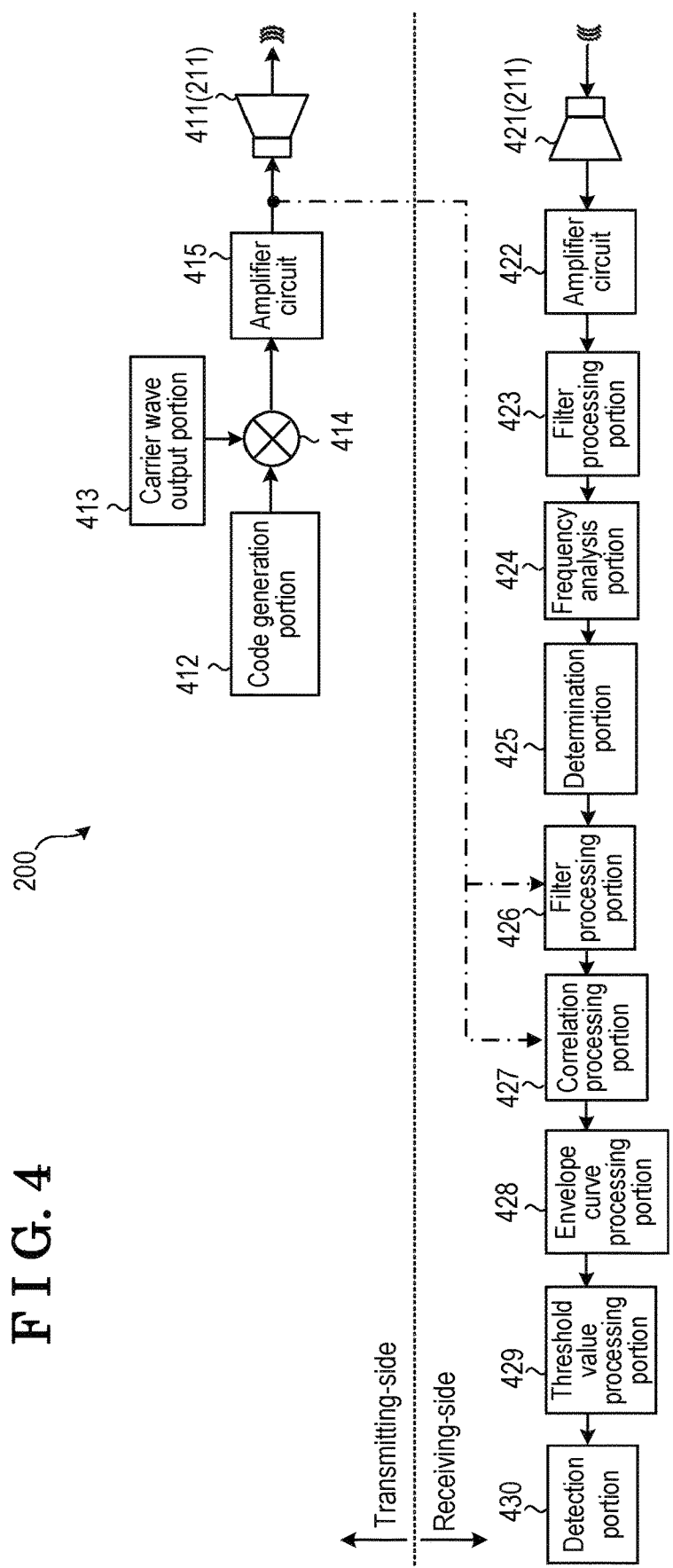
FIG. 4 is a schematic block diagram illustrating a detailed configuration of the distance detection apparatus according to the embodiment.

FIG. 4 is a schematic example block diagram illustrating a detailed configuration of the distance detection apparatus 200 according to the embodiment. In the example illustrated in FIG. 4, the configuration of the transmitting-side and the configuration of the receiving-side are separated from each other, however, the manner illustrated in FIG. 4 is intended to be for convenience of the explanation. As described above, in the embodiment, both of the transmission of the transmission wave and the reception of the reception wave are realized by the (single) transmitting and receiving portion 210 including the (single) vibrator 211. However, as described above, the technique of the embodiment is applicable to the configuration in which the configuration of the transmitting-side and the configuration of the receiving-side are separated from each other.

As illustrated in FIG. 4, the distance detection apparatus 200 includes a wave transmitter 411, a code generation portion 412, a carrier wave output portion 413, a multiplier 414 and an amplifier circuit 415, as the configuration of the transmitting-side. The wave transmitter 411 is an example of "a receiving portion".

The distance detection apparatus 200 includes a wave receiver 421, an amplifier circuit 422, a filter processing portion 423, a frequency analysis portion 424, a determination portion 425, a filter processing portion 426, a correlation processing portion 427, an envelope curve processing portion 428, a threshold value processing portion 429 and a detection portion 430, as the configuration of the receiving-side. The wave receiver 421 is an example of "a receiving portion".

At least part of the configuration illustrated in FIG. 4 may be realized by an exclusive hardware (an analog circuit). The remaining part of the configuration may be realized as a result of cooperation of hardware and software with each other, more specifically, as a result that the processor 223 of the distance detection apparatus 200 reads out the computer program from the storage apparatus 222 and performs the computer program.

First, the configuration of the transmitting-side will be described briefly.

The wave transmitter 411 is configured of the vibrator 211, and transmits the transmission wave corresponding to a transmission signal outputted from the amplifier circuit 415 (that is, an amplified transmission signal), by the vibrator 211.

In the embodiment, in order to realize the more detailed detection of the information related to the object existing in the surroundings, the wave transmitter 411 transmits the transmission wave concurrently and parallelly with the wave transmitters 411 of the other distance detection apparatuses 200, under a control of the ECU 100, for example. Thus, in the embodiment, as described above, the source of the transmission wave that returned as the reception wave needs to be identified in some way. However, if the identification of the transmission source is realized only by applying the identification information including the long code length, the inconvenience such as the above-described deterioration of the rapidity of the object detection, may occur.

Figure 5:
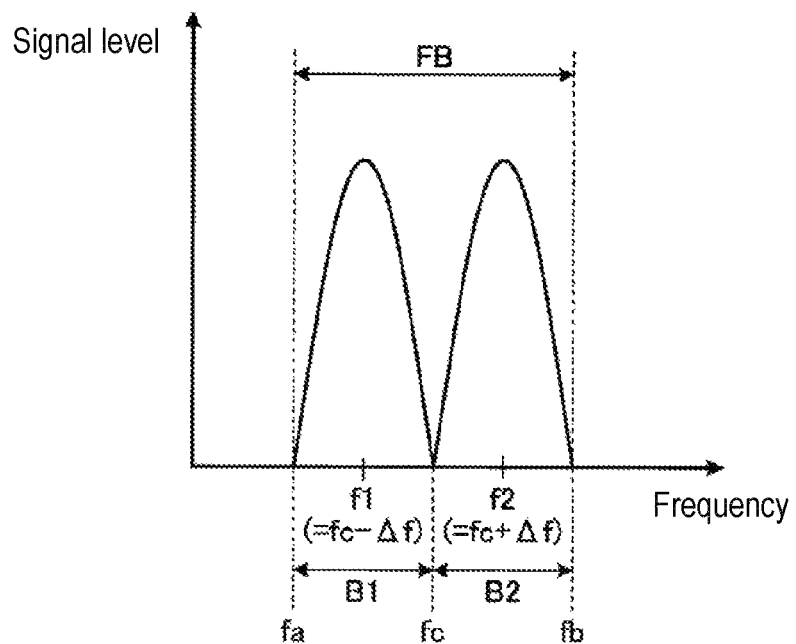
FIG. 5 is a schematic block diagram illustrating an example of a frequency of a transmission wave of the embodiment.

In the embodiment, the wave transmitter 411 transmits the transmission wave with the use of one of two bands formed by virtually or imaginarily dividing a predetermined frequency band as illustrated in FIG. 5, so that the identification of at least two distance detection apparatuses 200 is allowed without the dependence on the giving of the identification information.

FIG. 5 is a schematic example block diagram illustrating an example of a frequency of the transmission wave according to the embodiment. In the example of FIG. 5, the horizontal axis corresponds to a frequency and the vertical axis corresponds to a signal level (for example, PSD, that is, power spectral density).

As illustrated in FIG. 5, in the embodiment, the transmission wave is transmitted with the use of one of the two bands, that is, a band B1 and a band B2, which are formed by virtually dividing a predetermined frequency band FB and which do not overlap with each other. A center frequency f1 of the band B1 corresponds to the result obtained by subtracting a predetermined frequency $\Delta f$ from a center frequency fc of the predetermined frequency band FB. A center frequency f2 of the band B2 corresponds to the result obtained by adding the predetermined frequency $\Delta f$ to the center frequency fc of the predetermined frequency band FB.

For example, the predetermined frequency band FB is set according to specifications of the vibrator 211. Accordingly, a lower limit frequency fa and an upper limit frequency fb of the predetermined frequency band FB correspond respectively to the maximum frequency and the minimum frequency that the vibrator 211 is allowed to transmit in terms of its ability.

In the object detection system according to the embodiment, the four distance detection apparatuses 200 illustrated in FIG. 1 are divided into two groups or sets so that each of the groups includes two distance detection apparatuses 200. The wave transmitter 411 of one of the two distance detection apparatuses 200 forming each group transmits the transmission wave including a frequency in a range of one of the band B1 and the band B2, and the wave transmitter 411 of the other of the two distance detection apparatuses 200 forming each group transmits the transmission wave including a frequency in a range of the other of the band B1 and the band B2, in such a manner that the above-described two transmission actions are performed parallelly concurrently with each other. The above-described actions are performed under a control of the ECU 100, for example.

According to the above-described actions, for example, when it is assumed that the Doppler shift attributed to the occurrence of a relative speed of the object causing the reflection and the vehicle 1 relative to each other does not occur, the transmission waves transmitted at the frequencies in the ranges of the band B1 and the band B2 are received as the reception waves of the same frequencies in the ranges of the band B1 and the band B2. In this case, on the basis of a result of a frequency analysis of the reception waves and (predetermined) information related to the two frequencies of the transmission waves, a correspondence relationship between the frequency of the reception wave and the frequency of the transmission wave is allowed to be identified. Consequently, according to the above-described transmission actions, the source of the transmission wave returned as the reception wave is identifiable without relying on the giving of the identification information.

For example, the information related to the two frequencies of the transmission waves may include information indicating two frequencies which are set for every two distance detection apparatuses 200 out of the four distance detection apparatuses 200 provided at the object detection system and at which the signal levels of the transmission waves reach the peaks. For example, the result of the frequency analysis of the reception waves include information indicating frequencies at which the signal levels of the reception waves reach the peaks which are equal to or greater than a threshold value.

In the embodiment, in a case where the Doppler shift, which is attributed to the relative speed between the vehicle 1 and the object existing in the surroundings of the vehicle 1 and causing the reflection of the transmission wave, does not occur, the frequency at which the signal level of the transmission wave reaches the peak (the frequency which is set for every two distance detection apparatuses 200) and the frequency at which the signal level of the reception wave reaches the peak substantially coincide with each other. Thus, in such a case, the determination portion 425 is allowed to easily determine a correspondence relationship of a wave motion included in the transmission wave and a wave motion included in the reception wave to each other, which is related to the transmission and reception of the waves.

Even though the Doppler shift occurs when the four distance detection apparatuses 200 transmit the transmission waves substantially concurrently (concurrently and parallelly) with one another, if a degree of transition of the frequency caused by the Doppler shift is relatively small, such a case is assumed that the two frequencies of the transmission waves set within a range of the predetermined frequency band FB exist and the two frequencies of the reception waves detected as the result of the frequency analysis exist in the range of the predetermined frequency band FB. In such an above-described case, the transmission wave of the frequency at the higher-range-side and the reception wave of the frequency at the higher-range-side correspond to each other regarding the transmission and reception, and the transmission wave of the frequency at the lower-range-side and the reception wave of the frequency at the lower-range-side also correspond to each other regarding the transmission and reception, and therefore, the determination portion 425 determines the correspondence relationship between the wave motion included in the transmission wave and the wave motion included in the reception wave as described above, the correspondence relationship which is related to the transmission and reception of the waves. An interval between the two frequencies of the respective two wave motions included in the transmission wave and an interval between the two frequencies of the respective two wave motions included in the reception wave are supposed to coincide with each other even in a case where the Doppler shift occurs, and accordingly the determination portion 425 may use the intervals between the two frequencies to determine the correspondence relationship, regarding the transmission and reception, of the wave motion included in the transmission wave and the wave motion included in the reception wave to each other.

As described above, by identifying the correspondence relationship between the wave motion included in the transmission wave and the wave motion included in the reception wave which is relevant to the transmission and reception, the distance detection apparatus 200 of the embodiment obtains the difference between the transmission and reception timings of the transmission wave and the reception wave which correspond to each other. And thus, the distance detection apparatus 200 obtains, for example, the distance to the object existing in the surroundings of the vehicle 1 even in a case where the vehicle 1 or the object existing in the surroundings of the vehicle 1 is moving.

As the relative speed of the vehicle 1 and the object existing in the surroundings of the vehicle 1 relative to each other increases further, the Doppler shift occurs further. In a case where the further Doppler shift occurs when the four distance detection apparatuses 200 transmit the transmission waves substantially at the same time, only one of the frequencies of the reception waves detected as the result of the frequency analysis may exist in the range of the predetermined frequency band FB. According to the embodiment, however, the correspondence relationship between the frequency of the reception wave and the frequency of the transmission wave can be identified on the basis of the result of the frequency analysis of the reception waves and the information related to the two frequencies of the transmission waves, even in the case where only one of the frequencies of the reception waves exists within the range of the predetermined frequency band FB, as will be described in detail later. Consequently, according to the embodiment, the source of the transmission wave that returned as the reception wave is identified regardless of whether or not the Doppler shift is occurring and without depending on the application of the identification information.

As described above, in the embodiment, the wave transmitter 411 transmits, as the transmission wave, a first wave motion of one of two first frequencies set in the range of the predetermined frequency band FB concurrently (concurrently and parallelly) with the other distance detection apparatuses 200 wherein said one first frequency is different from the other distance detection apparatuses 200. The two first frequencies are set in the ranges of the two bands B1 and B2, respectively. The band B1 and the band B2 are formed by virtually dividing the predetermined frequency band FB set on the basis of the specifications of the vibrator 211 so as not to overlap with each other.

The number of the distance detection apparatuses 200 that are identifiable or distinguishable in the method according to the above-described band division corresponds to the number of the bands formed by the band division. Accordingly, in a case where the predetermined frequency band FB is divided into two as in the example indicated in FIG. 5, the identification between only two of the distance detection apparatuses 200 can be realized.

However, as illustrated in FIG. 1, the embodiment assumes the four distance detection apparatuses 200 as the example. Thus, in the embodiment, by combining the method on the basis of the above-described band division and the method on the basis of the above-described giving of the identification information to the transmission wave with each other and performing the combination of the methods, the identification among the four distance detection apparatuses 200 is enabled. An example will be described hereunder in which the predetermined frequency band FB is divided into two and one of the two bands is allocated to two of the distance detection apparatuses 200 and the other of the two bands is allocated to the remaining two distance detection apparatuses 200 (which corresponds to the former method) and two of the identification informations are used and one of the two identification informations is allocated to two of the distance detection apparatuses 200 and the other of the two identification informations is allocated to the remaining two distance detection apparatuses 200 (which corresponds to the latter method), for example.

That is, in FIG. 4, the code generation portion 412 generates a signal (a pulse signal) corresponding to a code of a bit sequence formed of a series of bits of 0 or 1, for example. A length of the bit sequence corresponds to the code length of the identification information given to the transmission signal.

As described above, the longer the code length of the identification information becomes, the longer the transmission time of the transmission wave becomes accordingly, which may reduce the rapidity of the object detection. Thus, in the embodiment, the code length of the identification information is set at a code length by which two of the distance detection apparatuses 200 are identifiable from each other and that is shorter than a code length by which all of the four distance detection apparatuses 200 are identifiable from one another. By combining the above-described setting of the code length with the method based on the band division illustrated in FIG. 5, four of the distance detection apparatuses 200 (that is, 2×2=4) can be identified from one another in the embodiment.

The carrier wave output portion 413 outputs a carrier wave serving as a signal to which the identification information is given. For example, the carrier wave is configured as a sine wave of a frequency that is within the range of the band B1 or the band B2 illustrated in FIG. 5.

The multiplier 414 performs tuning of the carrier wave such that the identification information is given, by multiplying output from the code generation portion 412 and output from the carrier wave output portion 413 by each other. Then, the multiplier 414 outputs, to the amplifier circuit 415, the tuned carrier wave to which the identification information has been given, as the transmission signal serving as a basis of the transmission wave. As a method of the tuning, any one of generally known tuning methods including an amplitude modulation method and a phase modulation method, or a combination of two or more of the known methods with each other can be used, for example.

The amplifier circuit 415 amplifies the transmission signal outputted from the multiplier 414 and outputs the amplified transmission signal to the wave transmitter 411.

As described above, in the embodiment, in a case where the four distance detection apparatuses 200 are divided into two first distance detection apparatuses (for example, the distance detection apparatuses 201 and 202) and two second distance detection apparatuses (for example, the distance detection apparatuses 203 and 204), each of the first distance detection apparatuses transmits the transmission wave of the frequency in the range of the band that is included in the plural bands formed by the above-described band division and that is different from the other first distance detection apparatus, in a manner that the first distance detection apparatus transmits the transmission wave substantially concurrently and parallelly with the other first distance detection apparatus and the second distance detection apparatuses. At this time, each of the first distance detection apparatuses encodes the transmission wave such that the transmission wave includes first information as the identification information, and then transmits the coded transmission wave. Similarly, each of the second distance detection apparatuses transmits the transmission wave of the frequency that is in the range of the band (out of the plural bands formed by the above-described band division) which is different from the other second distance detection apparatus (the band may overlap with the band of the first distance detection apparatuses in terms of the relation between the second distance detection apparatuses and the first distance detection apparatuses) in a manner that the second distance detection apparatus transmits the transmission wave concurrently and parallelly with the other second distance detection apparatus and the first distance detection apparatuses. At this time, each of the second distance detection apparatuses encodes the transmission wave so as to include, as the identification information, second information that differs from the first information, and then transmits the coded transmission wave.

Next, the configuration of the receiving-side will be described briefly.

The wave receiver 421 is configured of the vibrator 211, and receives with the use of the vibrator 211 the transmission wave reflected by the object, as the reception wave.

The amplifier circuit 422 amplifies a reception signal serving as a signal corresponding to the reception wave that the wave receiver 421 receives.

The filter processing portion 423 performs filter processing on the reception signal that has been amplified by the amplifier circuit 422 and suppresses noises.

In the embodiment, as described above, the correspondence relationship between the frequency of the transmission wave and the frequency of the reception wave needs to be identified for identifying the source of the transmission wave returned as the reception wave. In this regard, when it is assumed that the Doppler shift does not occur, the frequency of the transmission wave and the frequency of the reception wave basically coincide with each other, and thus it is easy to identify the correspondence relationship between the both frequencies. However, in a case where the Doppler shift occurs, the correspondence relationship between the frequency of the transmission wave and the frequency of the reception wave needs to be identified on the basis of the result of the frequency analysis of the reception wave and the information related to the frequency of the transmission wave, as illustrated in FIG. 6.

Figure 6:
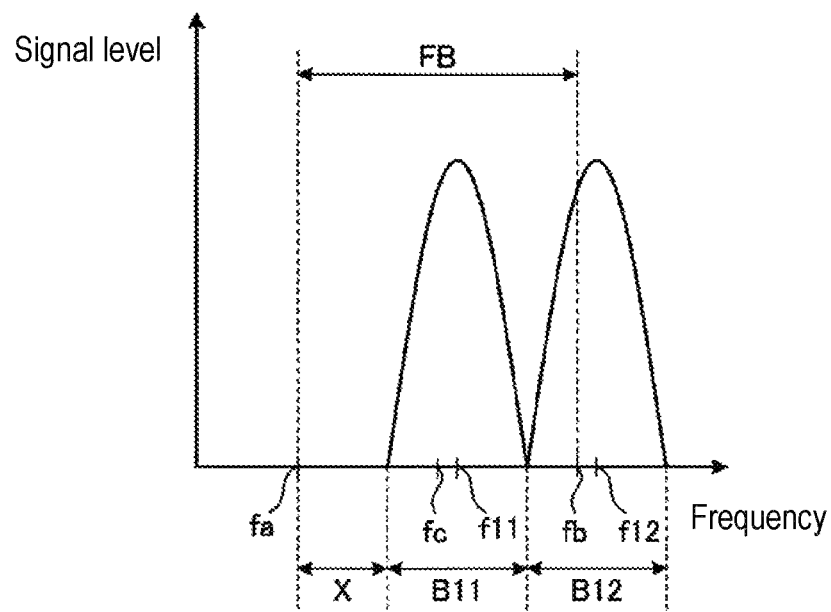
FIG. 6 is a schematic block diagram illustrating an example of a frequency of a reception wave of the embodiment.

FIG. 6 is a schematic example block diagram illustrating an example of the frequency of the reception wave of the embodiment. More specifically, FIG. 6 indicates an example of the frequencies of the reception waves received by the wave receiver 421 as the result that the transmission waves of the two frequencies in the ranges of the bands B1 and B2 illustrated in FIG. 5 are reflected by the object. In the example illustrated in FIG. 6, the horizontal axis indicates a frequency and the vertical axis indicates a signal level (for example, PSD, that is, power spectral density).

In the example illustrated in FIG. 6, when the transmission waves are received as the reception waves, the transition of the frequencies towards the high-range-side is caused by the Doppler shift. More specifically, a band B11 (a center frequency f11) illustrated in FIG. 6 corresponds to a result of the transition of the B1 (the center frequency f1) illustrated in FIG. 5 towards to the high-range-side, and a band B12 (a center frequency f12) illustrated in FIG. 6 corresponds to a result of the transition of the B2 (the center frequency f2) illustrated in FIG. 5 towards to the high-range-side.

In the embodiment, since the wave receiver 421 uses the vibrator 211 commonly with the wave transmitter 411, the wave receiver 421 can only receive a reception wave of which a frequency lies within the range of the predetermined frequency band FB set according to the specifications of the vibrator 211. On the other hand, in the example illustrated in FIG. 6, the center frequency f11 of the band B11 exists between the lower limit frequency fa and the upper limit frequency fb of the predetermined frequency band FB, but the center frequency f12 of the band B12 is shifted or deviated towards the high-range-side relative to the upper limit frequency fb of the predetermined frequency band FB. Accordingly, in the example illustrated in FIG. 6, the reception wave of the frequency within the range of the band B11 is received in a normal manner, but the reception wave of the frequency within the range of the band B12 is not easily received in the normal manner.

A relationship between the band B11 and the band 12 which are illustrated in FIG. 6 (an interval between the center frequencies f11 and f12, for example) and a relationship between the band B1 and the band B2 which are illustrated in FIG. 5 (an interval between the center frequencies f1 and f2, for example) are supposed to coincide with each other regardless of whether or not the Doppler shift occurs. On the basis thereof, even in such a case indicated in FIG. 6 where the transmission waves of the two frequencies are received as the transmission wave of one frequency only in a normal manner, it can be determine to which of the transmission waves of the two frequencies the transmission wave of the one frequency corresponds.

For example, in the example illustrated in FIG. 6, when assuming that the reception wave of the frequency within the range of the band B11 corresponds to the transmission wave of the frequency within the range of the band B2 illustrated in FIG. 5, a band indicating the signal level similar to the band B1 illustrated in FIG. 5 should exist within the range of the predetermined frequency band FB to be at the lower-range-side than the band B11. In the example illustrated in FIG. 6, however, the lower-range-side relative to the band B11 in the range of the predetermined frequency band FB is a blank band X. Consequently, in the example illustrated in FIG. 6, the reception wave of the frequency within the range of the band B11 may be determined to correspond to the transmission wave of the frequency within the range of the band B1 illustrated in FIG. 5.

More specifically, as illustrated in FIG. 6, a direction of the transition of the frequencies due to the Doppler shift, that is, a position of the blank band X can be identified, on the basis of a magnitude relationship between an interval provided between the center frequency f11 of the band B11 (the center frequency f11 a frequency that is actually detected within the range of the predetermined frequency band FB as the frequency of the reception wave whose signal level reaches the peak that is equal to or greater than the threshold value) and the upper limit frequency fb and another interval provided between the center frequencies f1 and f2 where the signal levels of the transmission waves reach the peaks, said another interval corresponding to 2×Δf (that is, a value obtained by doubling the predetermined frequency Δf), and a magnitude relationship between an interval provided between the center frequency f11 of the band B11 and the lower limit frequency fa and said another interval provided between the center frequencies f1 and f2 where the signal levels of the transmission waves reach the peaks, said another interval corresponding to 2×Δf.

For example, it can be read out from the example illustrated in FIG. 6 that, the interval between the center frequency f11 and the upper limit frequency fb is smaller than 2×Δf, and the interval between the center frequency f11 and the lower limit frequency fa is greater than 2×Δf. In this case, the determination portion 425 determines that the wave motion which had been transmitted by using the band B2 such that the signal level reaches the peak at the center frequency f2 (refer to FIG. 5) became the wave motion whose signal level reaches the peak at a higher frequency than the upper limit frequency fb (the wave motion which is out of the range of the predetermined frequency band FB, and thus is actually undetectable) as a result of the transition of the frequency due to the Doppler shift. That is, in the above-described case, the determination portion 425 determines that the blank band X exists between the center frequency f11, of the band B11, which is actually detected in the range of the predetermined frequency band FB and the lower limit frequency fa.

On the other hand, assuming if an interval between one frequency which is actually detected in the range of the predetermined frequency band FB as the frequency of the reception wave whose signal level reaches the peak that is equal to or greater than the threshold value and the upper limit frequency fb is greater than 2×Δf, and an interval between the above-described one frequency and the lower limit frequency fa is smaller than 2×Δf, the determination portion 425 determines that the wave motion which had been transmitted by using the band B1 such that the signal level reaches the peak at the center frequency f1 (refer to FIG. 5) became the wave motion whose signal level reaches the peak at a lower frequency than the lower limit frequency fa (the wave motion which is out of the range of the predetermined frequency band FB, and thus is actually undetectable) as a result of the transition of the frequency due to the Doppler shift. That is, in such a case, the determination portion 425 determines that the blank band exists between the one frequency actually detected in the range of the predetermined frequency band FB and the upper limit frequency fb.

A method of determining the position of the blank band is not limited to the methods described here. For example, as other method of determining the position of the blank band, the position of the blank band may be determined on the basis of to which of the lower frequency fa and the upper frequency fb one frequency actually detected in the range of the predetermined frequency band FB is closer.

In the embodiment, the configuration is described in which the correspondence relationship between the wave motions transmitted and received by each of the four distance detection apparatuses 200 is determined. However, the technique of the embodiment is not limited to the configuration in which the number of the distance detection apparatus 200 serving as an object of the determination is four, and the determination can be performed relative to various other numbers of the distance detection apparatus 200, instead of four, depending on an implementation manner. For example, in a configuration in which eight of the distance detection apparatuses 200 transmit the transmission waves substantially at the same time (concurrently and parallelly) with one another, the predetermined frequency band FB may be divided into two and four kinds of the identification information may be used, and thus the determination among the eight distance detection apparatuses 200 can be realized appropriately.

In the embodiment, a configuration is also conceivable in which the determination of the distance detection apparatuses 200 is realized by combining the method based on the band division with another method other than the method of giving the identification information to the transmission waves. Further, in the embodiment, another configuration is also conceivable in which the determination of the distance detection apparatuses 200 is realized by combining all of the above-described another method, the method based on the band division and the method of giving the identification information to the transmission wave.

In a case where a degree of the Doppler shift is smaller than the example illustrated in FIG. 6, it is conceivable that both of the reception waves of the two frequencies in the ranges of the two bands which fall within the range of the predetermined frequency band FB are received in the normal way. In this case, magnitudes or sizes of the blank bands existing at both the low-range-side and the high-range-side relative to the two frequencies of the reception waves may be compared to each other, and the direction of the transition of the frequencies may be identified. Thus, the correspondence relationship between the frequency of the reception wave and the frequency of the transmission wave can be determined.

As described above, in the embodiment, by focusing on the result of the frequency analysis of the reception wave and the information related to the frequency of the transmission wave, the correspondence relationship between the frequency of the reception wave and the frequency of the transmission wave can be determined in consideration of the blank band.

In FIG. 4, the frequency analysis portion 424 performs the frequency analysis (a spectral analysis) based on, for example, FFT (fast Fourier transform), on the reception signal that has undergone the filter processing performed by the filter processing portion 423.

Then, in accordance with the result of the frequency analysis conducted by the frequency analysis portion 424 and the information regarding the frequency of the transmission wave (that is, the transmission signal), the determination portion 425 identifies the correspondence relationship between the frequency of the reception wave and the frequency of the transmission wave in the above-described procedure. More specifically, in a case where the relationship of the frequency of the reception signal obtained as the result of the frequency analysis does not coincided with the relationship of the frequency of the transmission signal, the determination portion 425 determines the correspondence relationship between the frequency of the reception signal and the frequency of the transmission signal on the basis of the blank band existing at the lower-range-side or the higher-range-side than the frequency of the reception signal in the range of the predetermined frequency band FB.

Then, on the basis of the determination result by the determination portion 425, the filter processing portion 426 extracts a signal in a predetermined frequency band (a frequency band corresponding to the frequency of the transmission signal, for example) from the reception signal that may include one or more signals of one or more frequencies. In order for the correlation processing portion 427 to perform a correlation processing, which is the subsequent processing, more accurately, the filter processing portion 426 may correct the extracted signal such that matching is made with the frequency of the transmission signal.

The correlation processing portion 427 obtains a correlation value corresponding to a degree of similarity of the identification information of the transmission wave and the reception wave to each other, on the basis of the transmission signal obtained from the configuration of the transmitting-side and the signal that has undergone the filter processing by the filter processing portion 426, for example. The correlation value is calculated according to a known correlation function, for example.

The envelope curve processing portion 428 obtains the envelope curve of a wave form of the signal corresponding to the correlation value obtained by the correlation processing portion 427.

The threshold value processing portion 429 compares a value of the envelope curve obtained by the envelope curve processing portion 428 and a predetermined threshold value to each other.

The detection portion 430 identifies, on the basis of a comparison result by the threshold value processing portion 429, the timing (the timing t4 indicated in FIG. 2, for example) at which the signal level of the reception wave reaches the peak exceeding the threshold value, and detects the distance to the object in the TOF method.

The above-described configurations at the distance detection apparatus 200 may operate under control of the control portion 220 of the distance detection apparatus 200 or may operate under control of the ECU 100 in the outside.

As described above, in accordance with the determination processing performed by the determination portion 425 and the correlation processing performed by the correlation processing portion 427, each of the four distance detection apparatuses 200 of the embodiment extracts, from the reception wave received by the wave receiver 421, the reception wave of the particular frequency to which the particular identification information is given, and detects the distance to the object on the basis of the difference between the receiving timing of the reception wave and the transmitting timing of the transmission wave.

In the embodiment, each of the four distance detection apparatuses 200 does not need to detect the distance to the object on the basis of the reception wave corresponding to the transmission wave transmitted by the distance detection apparatus 200 itself. For example, the distance detection apparatus 201 may detect a round-trip flight distance or round-trip travel distance of the ultrasonic waves on the basis of the reception wave corresponding to the transmission wave transmitted by the distance detection apparatus 202 and the transmission wave transmitted by the distance detection apparatus 201. A positional relationship between the distance detection apparatus 201 and the distance detection apparatus 202 with each other is fixed, and thus the distance to the object can be detected on the basis of the round-trip travel distance of the ultrasonic waves in consideration of the positional relationship.

In the predetermined frequency band FB set according to the specifications of the vibrator 211, a band in which power is outputted most efficiently corresponds to a band in the vicinity of the center frequency fc of the predetermined frequency band FB. In this regard, the above-described method based on the band division is not a method of using only the band in the vicinity of the center frequency fc. Accordingly, the above-described method based on the band division may not be the best method in a case where, for example, the transmission wave needs to be transmitted with strong power in order to detect the object existing at a long distance.

Figure 7:
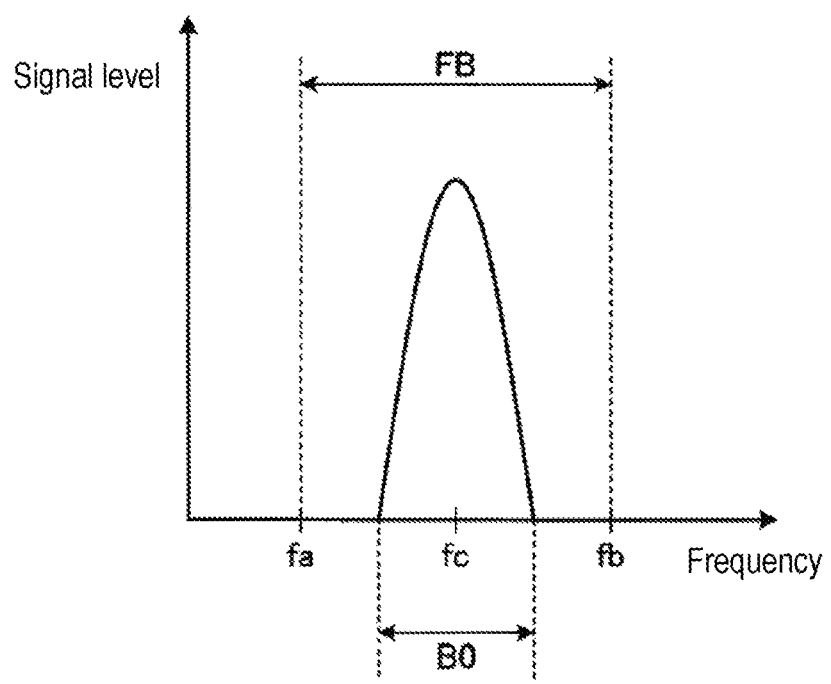
FIG. 7 is a schematic block diagram illustrating another example of a frequency of the transmission wave of the embodiment.

Thus, in the embodiment, the distance detection apparatus 200 is configured to switch between a mode in which the transmission wave is transmitted with the use of the two bands B1 and B2 illustrated in FIG. 5 and a mode in which the transmission wave is transmitted with the use of one band B0 illustrated in FIG. 7, depending on the circumstances.

FIG. 7 is a schematic example block diagram illustrating another example of the frequency of the transmission wave related to the embodiment. In the example illustrated in FIG. 7, the horizontal axis indicates a frequency and the vertical axis indicates a signal level (for example, PSD, that is, power spectral density).

In the example illustrated in FIG. 7, because a center frequency of the band B0 coincides with the center frequency fc of the predetermined frequency band FB, the band B0 is the band in which the power is outputted most efficiently. Accordingly, for example, when the transmission wave needs to be transmitted with strong power in order to detect the object existing at a long distance, by switching from the mode in which the transmission wave is transmitted with the use of the two bands B1 and B2 as illustrated in FIG. 5 to the mode in which the transmission wave is transmitted with the use of a frequency (i.e., a third frequency) within a range of the band B0, an appropriate detection of the distance can be realized according to the circumstances. In the mode in which only the frequency that lies in the range of the band B0 is used, the code length of the identification information given to the transmission wave needs to be set long enough so that all of the distance detection apparatuses 200 can be determined.

As described above, in the embodiment, the control portion 220 of the distance detection apparatus 200 can control the transmission manner of the transmission wave by the wave transmitter 411 to either of a first mode (for example, a medium-and-short distance mode) in which the transmission wave is transmitted in the method based on the band division and a second mode (for example, a long distance mode) in which a wave motion (i.e., a third wave motion) of the frequency in the vicinity of the center frequency fc of the predetermined frequency band FB is transmitted as the transmission wave, in accordance with the distance to the object O. The distance to the object O corresponds to the detection result of the detection portion 430. In the embodiment, the above-described control of the modes may be performed by the ECU 100.

A flow of processing performed in the embodiment will be described hereunder.

Figure 8:
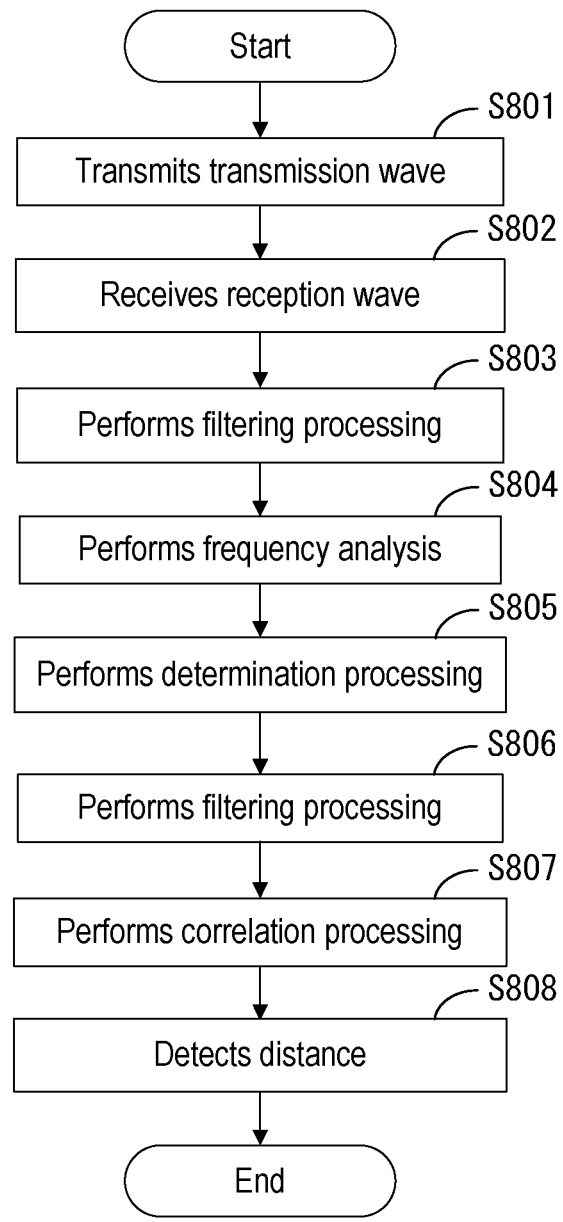
FIG. 8 is a schematic flowchart indicating a series of processing performed by the distance detection apparatus according to the embodiment to detect information related to the object.

FIG. 8 is a schematic example flowchart indicating a series of process that the distance detection apparatus 200 performs to detect the information related to the object according to the embodiment.

As illustrated in FIG. 8, first, at S801, the wave transmitter 411 transmits the transmission wave corresponding to the transmission signal generated by the code generation portion 412, the carrier wave output portion 413, the multiplier 414 and the amplifier circuit 415, towards the outside of the vehicle 1.

For example, a case is assumed in which the four distance detection apparatuses 200 illustrated in FIG. 1 are divided into the two first distance detection apparatuses (for example, the distance detection apparatuses 201 and 202) and the two second distance detection apparatuses (for example, the distance detection apparatuses 203 and 204). In this case, at S801, the wave transmitter 411 of each of the first distance detection apparatuses encodes the transmission wave of the frequency within the range of the band which is included in the plural bands formed by the above-described band division and which is different from the other first distance detection apparatus such that the wave includes, as the identification information, the first information. Then, the wave transmitter 411 transmits the encoded transmission wave concurrently and parallelly with the other first distance detection apparatus and the second distance detection apparatuses. In a similar manner, at S801, the wave transmitter 411 of each of the second distance detection apparatuses encodes the transmission wave of the frequency within the range of the band which is included in the plural bands formed by the band division and which is different from the other second distance detection apparatus (the band may overlap with the band of the first distance detection apparatuses in terms of the relation between the second distance detection apparatuses and the first distance detection apparatuses) such that the wave includes, as the identification information, the second information that differs from the first information. Then, the wave transmitter 411 transmits the encoded transmission wave concurrently and parallelly with the other second distance detection apparatus and the first distance detection apparatuses. The band and the identification information that each of the distance detection apparatuses 200 uses may be determined by, for example, the ECU 100.

At S802, the wave receiver 421 receives the reception wave serving as the transmission wave that was reflected by the object existing outside the vehicle 1 and consequently returned towards the vehicle 1. The reception signal corresponding to the reception wave is amplified by the amplifier circuit 422 and then is outputted to the filter processing portion 423.

At S803, the filter processing portion 423 performs the filter processing on the amplified reception signal amplified by the amplifier circuit 422 and thereby reducing or suppressing the noises.

At S804, the frequency analysis portion 424 performs the frequency analysis (the spectral analysis) based on, for example, the FFT (the fast Fourier transform), on the reception signal that has undergone the filter processing by the filter processing portion 423. Thus, one or more frequencies included in the reception waves are identified.

At S805, the determination portion 425 determines the correspondence relationship between the frequency of the reception wave and the frequency of the transmission wave, on the basis of the relationship between the one or more frequencies of the reception wave obtained as the result of the frequency analysis performed by the frequency analysis portion 424 and the plural frequencies (substantially two, in the band division illustrated in FIG. 5) of the transmission waves transmitted by all of the distance detection apparatuses 200. As described above, in a case where the frequency of the reception wave and the frequency of the transmission wave do not coincide with each other, the correspondence relationship between the frequency of the reception wave and the frequency of the transmission wave can be determined by considering the blank band existing at least one of the high-range-side and the low-range-side relative to the one or more frequency of the reception wave.

At S806, on the basis of the determination result by the determination portion 425, the filter processing portion 426 extracts the signal of the predetermined frequency band (the frequency band corresponding to the frequency of the transmission signal, for example) from the reception signal that may include one or more signals of one or more frequencies.

At S807, the correlation processing portion 427 obtains the correlation value corresponding to the degree of similarity of the identification information of the transmission wave and the reception wave to each other, on the basis of the transmission signal obtained from the configuration of the transmitting-side and the signal on which the filter processing has been performed by the filter processing portion 426, for example.

At S808, the detection portion 430 detects the distance to the object that causes the reflection of the transmission wave, on the basis of the correlation value obtained by the correlation processing portion 427.

More specifically, at S808, first, the detection portion 430 obtains, from the threshold value processing portion 429, the result of the comparison between the correlation value on which the processing has been performed by the envelope curve processing portion 428 and the threshold value. Then, on the basis of the information obtained from the threshold value processing portion 429, the detection portion 430 identifies the timing at which the transmission wave was transmitted and the timing at which the reception wave was received, the reception wave to which the identification information that is similar to (that coincides with) the transmission wave at a level equal to or greater than a predetermined level has been given. Then, the detection portion 430 detects the distance to the object that reflected the transmission signal, on the basis of the difference between the both timings with the use of the TOF method. Then, the process ends.

As described above, the object detection system according to the embodiment includes the plural distance detection apparatuses 200. Each of the plural distance detection apparatuses 200 includes the wave transmitter 411, the wave receiver 421, the determination portion 425 and the detection portion 430. As the transmission wave, the wave transmitter 411 transmits the wave motion of the frequency, from among the plural frequencies set in the range of the predetermined frequency band FB, which is different from the other distance detection apparatuses 200, in the concurrent manner with the other distance detection apparatuses 200. The wave receiver 421 receives the reception wave that is based on the transmission wave returning in response to the reflection by the object. The determination portion 425 determines the correspondence relationship between the one or more frequencies of the one or more wave motions included in the reception wave and the plural frequencies of the transmission wave, on the basis of the result of the frequency analysis of the reception wave and the information related to the plural frequencies of the transmission waves. The detection portion 430 detects the information related to the object on the basis of the information obtained according to the determination result of the determination portion 425.

In other words, in the embodiment, each of the distance detection apparatuses 200 is the apparatus configured to transmit and receive the wave motion of the frequency included in the predetermined frequency band FB, and includes the wave transmitter 411, the wave receiver 421, the determination portion 425 and the detection portion 430. The wave transmitter 411 transmits, as the transmission wave, the wave motion (the first wave motion) whose signal level comes to the peak at the first frequency included in the plural first frequencies that are set for the respective plural distance detection apparatuses 200 including the distance detection apparatus 200 provided with the wave transmitter 411 itself and the other distance detection apparatuses 200, and that are in the range of the predetermined frequency band FB. The wave receiver 421 receives the reception wave based on the transmission wave that returned due to the reflection at the object. On the basis of the result of the frequency analysis performed on the reception wave and the information related to the plural first frequencies, the determination portion 425 determines a second frequency at which the signal level of the wave motion (a second wave motion) included in the reception wave and serving as a wave motion corresponding to the first wave motion reaches the peak. On the basis of the information obtained according to the determination result of the determination portion 425, the detection portion 430 detects the information related to the object.

According to the above-described configuration, the source or the sender of the transmission wave returned as the reception wave is determined in the simple method in which the frequencies used for sending the transmission waves are made different for each of the distance detection apparatuses 200 and thus the correspondence relationship between the frequencies of the transmission wave and the reception wave is determined. Compared to a case in which the determination of the distance detection apparatuses 200 relies only on the application of the identification information, the transmission time of the transmission waves can be shortened. Thus, the rapidity in the detection of the information related to the object existing in a short distance can be assured.

In the embodiment, in a case where the number of one or more frequencies of the reception wave obtained as a result of the frequency analysis and the number of the frequencies of the transmission wave does not coincide with each other, the determination portion 425 determines the correspondence relationship between the frequency of the reception wave and the frequency of the transmission wave on the basis of the blank band existing at least one of the lower-range-side and the higher-range-side than the frequency of the reception wave within the range of the predetermined frequency band FB. According to the above-described configuration, even in a case where the number of the frequency of the transmission wave and the number of the frequency of the reception wave do not coincide with each other due to, for example, the occurrence of the Doppler shift, the correspondence relationship between the frequency of the transmission wave and the frequency of the reception wave is determined easily by considering the blank band.

In the embodiment, a case is assumed in which the four distance detection apparatuses 200 illustrated in FIG. 1 are divided into two of the first distance detection apparatuses (for example, the distance detection apparatuses 201 and 202) and two of the second distance detection apparatuses (for example, the distance detection apparatuses 203 and 204). In this case, the wave transmitter 411 of each of the first distance detection apparatuses encodes the transmission wave of the frequency within the range of the band which is different from the other first distance detection apparatus such that the encoded wave includes, as the identification information, the first information. Then, the wave transmitter 411 transmits the coded transmission wave concurrently and parallelly with the other first distance detection apparatus and the second distance detection apparatuses. The wave transmitter 411 of each of the second distance detection apparatuses encodes the transmission wave of the frequency within the range of the band which is different from the other second distance detection apparatus (the band may overlap with the band of the first distance detection apparatuses in terms of the relation between the second distance detection apparatuses and the first distance detection apparatuses) such that the encoded wave includes, as the identification information, the second information that differs from the first information. Then, the wave transmitter 411 transmits the coded transmission wave in the concurrent manner with the other second distance detection apparatus and the first distance detection apparatuses.

In the embodiment, each of the distance detection apparatuses 200 includes the correlation processing portion 427 that obtains the correlation value corresponding to the degree of similarity in the identification information of the transmission wave and the identification information of the reception wave to each other on the basis of the determination result of the corresponding determination portion 425. The detection portion 430 of each of the distance detection apparatuses 200 detects the information related to the object on the basis of the comparison result of the correlation value and the threshold value with each other. According to the above-described configuration, even larger number of distance detection apparatuses 200 can be easily determined by utilizing the identification information.

In the embodiment, the plural frequencies used for transmitting the transmission waves are respectively set in the ranges of the plural bands which do not overlap each other or one another and which are formed by imaginarily dividing the predetermined frequency band FB. According to the above-described configuration, the plural frequencies that differ from each other or one another can be set easily with use of the method on the basis of the band division.

In the embodiment, the detection portion 430 detects, as the information related to the object, the distance to the object on the basis of the difference between the timing at which the transmission wave was transmitted and the timing at which the reception wave was received. According to the above-described configuration, the distance to the object can be detected easily.

In the embodiment, each of the distance detection apparatuses 200 includes the control portion 220. The control portion 220 is configured to control the transmission manner of the transmission wave sent by the wave transmitter 411 to either the first mode or the second mode depending on the distance to the object which serves as the detection result of the detection portion 430. In the first mode, the wave motion of the frequency which is different from the other distance detection apparatuses 200 is transmitted as the transmission wave. In the second mode, the waveform of the frequency in the vicinity of the center frequency fc of the predetermined frequency band FB is transmitted as the transmission wave. According to the above-described configuration, the first mode where only part of the band in the predetermined frequency band FB is used and the second mode where the band which is in the predetermined frequency band FB, which is in the vicinity of the center frequency fc, and in which the power is outputted efficiently can be switched depending on the circumstances.

In the embodiment, the wave transmitter 411 and the wave receiver 421 of each of the distance detection apparatuses 200 are configured integrally with each other to serve as the transmitting and receiving portion 210 including the single vibrator 211 that can transmit and receive the ultrasonic waves, and the predetermined frequency band FB is set according to the specifications of the vibrator 211. According to the above-described configuration, the configuration for transmitting and receiving the transmission wave and the reception wave can be simplified, and the predetermined frequency band FB can be set easily.

(Variations) In the above-described embodiment, the technique of the disclosure is applied to the configuration detecting the information related to the object via the transmission and reception of the ultrasonic wave, however, the disclosure is applicable to a configuration detecting the information related to the object by transmitting and receiving a wave motion including, for example, a sound wave, a millimeter wave and/or an electromagnetic wave, other than the ultrasonic wave.

In the above-described embodiment, the disclosed technique is described to be applicable to the distance detection apparatus detecting the distance to the object, however, the technique of the disclosure is applicable also to the object detection apparatus detecting only whether or not the object exists, that is, the presence or absence of the object, which serves as the information related to the object.

In the above-described embodiment, the configuration is described wherein the method based on the band division and the method in which the identification information is given to the transmission wave are combined with each other and performed, and thereby the determination or distinguishing of the plural distance detection apparatuses from each other or one another is realized. However, by setting the number of the bands formed by the band division to be a number that is equal to or greater than the number of the distance detection apparatuses, the plural distance detection apparatuses can be determined only in the method based on the band division. Even if the number of the bands formed by the band division is three or more, the method of determining the blank band is substantially same as the above-described embodiment, and therefore the detailed explanation will be omitted.

In the above-described embodiment, the example (refer to FIG. 4) is shown in which the distance detection apparatus including one detection portion that detects the information related to the object (the distance to the object). However, the technique of the disclosure assumes and envisages the distance detection system including plural detection portions detecting the information relating to the object as illustrated in FIG. 9.

Figure 9:
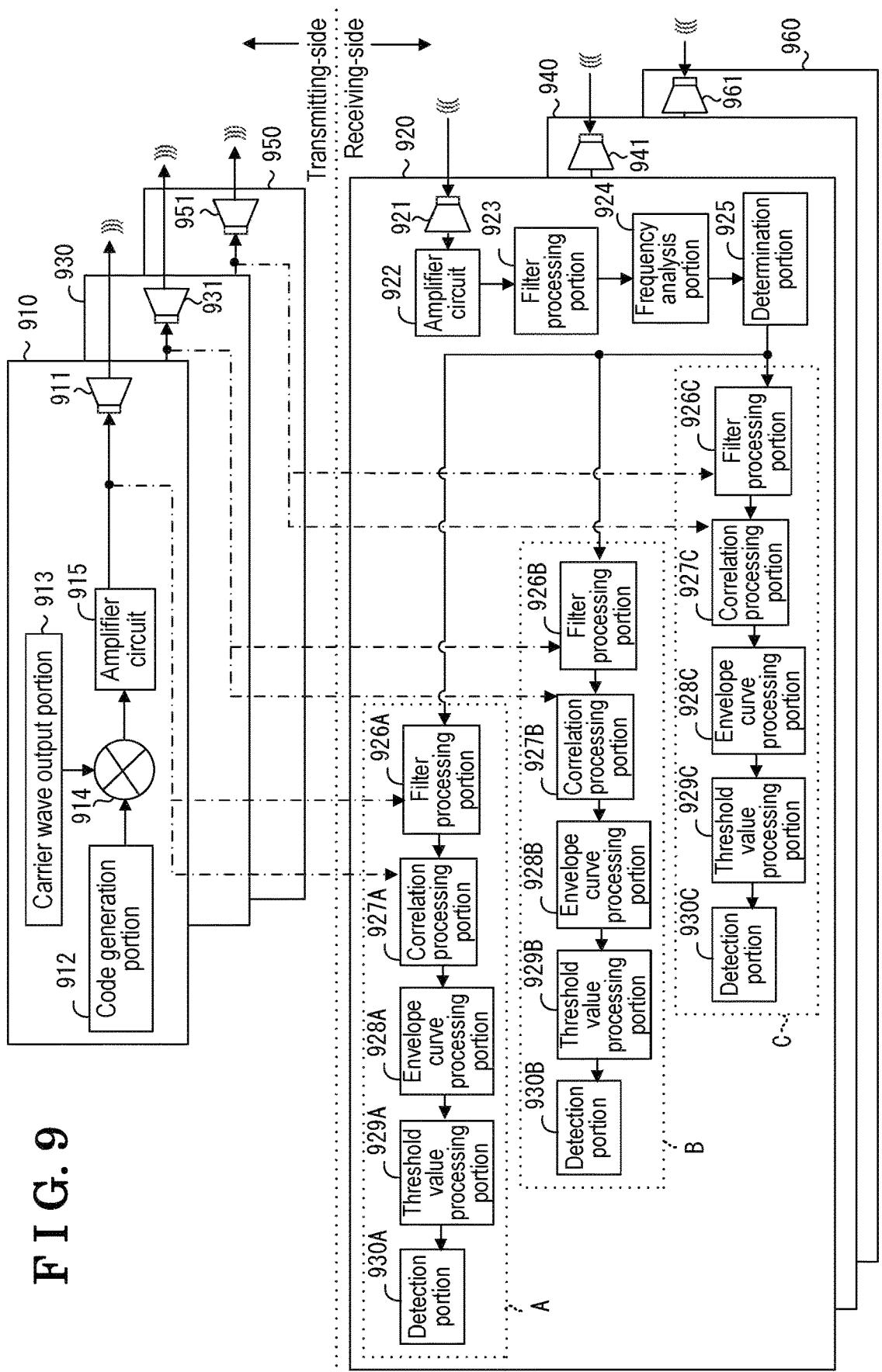
FIG. 9 is a schematic block diagram illustrating a detailed configuration of the distance detection system according to a modified example of the embodiment.

FIG. 9 is a schematic and example block diagram illustrating a detailed configuration of an object detection system according to a modified example of the embodiment.

As illustrated in FIG. 9, the object detection system according to the modified example includes three transmitting portions 910, 930 and 950 as a configuration of the transmitting-side, and three receiving portions 920, 940 and 960 as a configuration of the receiving-side. In the example illustrated in FIG. 9, for example, each of a combination of the transmitting portion 910 and the receiving portion 920, a combination of the the transmitting portion 930 and the receiving portion 940, and a combination of the the transmitting portion 950 and the receiving portion 960 configures one distance detection apparatus (the object detection apparatus).

In the modified example illustrated in FIG. 9, the transmitting portion 910 includes a wave transmitter 911, a code generation portion 912, a carrier wave output portion 913, a multiplier 914 and an amplifier circuit 915. The functions and operations of these configurations are substantially similar to the functions and operations of the configuration of the transmitting-side of the distance detection apparatus 200 (refer to FIG. 4, for example) according to the above-described embodiment, and therefore further explanation will be omitted.

As illustrated in FIG. 9, the transmitting portion 930 includes a wave transmitter 931 and the transmitting portion 951 includes a wave transmitter 951. The drawing is a schematic diagram, however, each of the transmitting portions 930 and 950 includes the configurations that are similar to the configurations of the transmitting portion 910, including the configuration that generates the transmission signal serving as the basis of the transmission wave, in addition to the wave transmitter 931 and the wave transmitter 951.

On the other hand, in the modified example illustrated in FIG. 9, the receiving portion 920 includes a wave receiver 921, an amplifier circuit 922, a filter processing portion 923, a frequency analysis portion 924 and a determination portion 925. The functions and operations of these configurations are substantially similar to the functions and operations of the wave receiver 421, the amplifier circuit 422, the filter processing portion 423, the frequency analysis portion 424 and the determination portion 425 of the above-described embodiment (refer to FIG. 4, for example), and therefore further explanation will be omitted.

In the modified example illustrated in FIG. 9, the receiving portion 920 includes plural configurations (each of which will be referred to as a signal processing system) each of which is similar to the configuration formed of the combination of the filter processing portion 426, the correlation processing portion 427, the envelope curve processing portion 428, the threshold value processing portion 429 and the detection portion 430 of the above-described embodiment (refer to FIG. 4, for example). The number of the plural signal processing systems of the receiving portion 920 is same as the number of the transmitting portions 910, 930, 950.

That is, in the modified example illustrated in FIG. 9, the receiving portion 920 includes three signal processing systems A, B and C. The signal processing system A is configured as a combination of a filter processing portion 926A, a correlation processing portion 927A, an envelope curve processing portion 928A, a threshold value processing portion 929A and a detection portion 930A. In a similar manner, the signal processing system B is configured as a combination of a filter processing portion 926B, a correlation processing portion 927B, an envelope curve processing portion 928B, a threshold value processing portion 929B and a detection portion 930B. In a similar manner, the signal processing system C is configured as a combination of a filter processing portion 926C, a correlation processing portion 927C, an envelope curve processing portion 928C, a threshold value processing portion 929C and a detection portion 930C.

In accordance with the determination result of the determination portion 925, the signal processing system A executes various processing on the basis of the reception signal corresponding to one of the reception waves of one or more frequencies which are included in the reception waves.

In accordance with the determination result of the determination portion 925, the signal processing system B executes various processing on the basis of the reception signal corresponding to one of the reception waves of one or more frequencies which are included in the reception waves, wherein the reception wave includes a different frequency different from the signal processing system A. In accordance with the determination result of the determination portion 925, the signal processing system C executes various processing on the basis of the reception signal corresponding to one of the reception waves of one or more frequencies which are included in the reception waves, wherein the reception signal includes a different frequency different from the signal processing system A and the signal processing system B.

The functions and operations of the signal processing systems A to C are substantially similar to the functions and operations of the signal processing system according to the above-described embodiment (refer to FIG. 4, for example), and therefore further explanation will be omitted. As illustrated in FIG. 9, the receiving portion 940 includes a wave receiver 941 and the receiving portion 960 includes a wave receiver 961. The drawing is a schematic diagram, however, each of the receiving portions 940 and 960 includes the configurations that are similar to the configurations of the receiving portion 920.

As described above, in the modified example illustrated in FIG. 9, the receiving portion 920 is configured to obtain, at the same time, the three correlation values between the transmission signals serving as the bases of the transmission waves transmitted from the three transmitting portions 910, 930, 950 and the reception signals corresponding to the reception waves serving as as the reflective waves of the transmission waves, respectively. In a similar manner, each of the receiving portion 940 and the receiving portion 960 is configured to obtain the three correlation values at the same time. Thus, in the modified example illustrated in FIG. 9, the distance to the object is detected in more detail in consideration of the three kinds of different information at the same time.

Similarly to the above-described embodiment, in the modified example illustrated in FIG. 9, the combination of the wave transmitter 911 and the wave receiver 921 may be configured of the same vibrator, or may be configured of the separate vibrators from each other. The same applies to the combination of the wave transmitter 931 and the wave receiver 941 and to the combination of the wave transmitter 951 and the wave receiver 961.

In the modified example illustrated in FIG. 9, three each of the configurations of the transmitting-side and the configurations of the receiving-side are provided, and three of the signal processing systems are provided at each of the configurations of the receiving-side, however, the number "three (3)" does not include specific technical meaning. Accordingly, the number of these configurations may be two, or four or more than four.

The number of the configurations of the transmitting-side and the number of the configurations of the receiving-side do not need to coincide with each other. The number of the configurations of the transmitting-side and the number of the signal processing systems provided at each of the configurations of the receiving-side do not need to coincide with each other.

The above-described embodiment and the modified examples that are disclosed here are presented as examples and are not provided to intend to limit the scope of the disclosure. The embodiment and the modified examples described above can be implemented in other various manners, and various omissions, substitutions and changes may be made without departing from the scope the disclosure. The embodiment and the modified examples described above are included in the scope and/or subject matter of the disclosure, and included in the disclosure described in the scope of claims and in a range of equivalents thereof.

According to the aforementioned embodiment, an object detection system includes plural distance detection apparatuses 200, 201, 202, 203, 204 (i.e., the first object detection apparatuses). Each of the plural distance detection apparatuses 200, 201, 202, 203, 204 includes a wave transmitter 411 or a transmitting portion 910, 930, 950 which are configured to transmit, as a transmission wave, a first wave motion of a first frequency included in plural first frequencies set within a range of a predetermined frequency band FB. The wave transmitter 411 or the transmitting portion 910, 930, 950 transmits the first wave motion of the first frequency which is different from the other distance detection apparatuses 200, 201, 202, 203, 204 concurrently with the other distance detection apparatuses 200, 201, 202, 203, 204. Each of the plural distance detection apparatuses 200, 201, 202, 203, 204 includes a wave receiver 421 or a receiving portion 920, 940, 960 which are configured to receive a reception wave that is based on the transmission wave returned due to reflection at an object O, and a determination portion 425, 925 configured to determine a correspondence relationship between one or more second frequency of one or more second wave motion included in the reception wave and the plurality of first frequencies, on the basis of a result of a frequency analysis of the reception wave and information related to the plural first frequencies. Each of the plural distance detection apparatuses 200, 201, 202, 203, 204 includes a detection portion 430, 930A, 930B, 930C configured to detect information related to the object O on the basis of information obtained according to a determination result of the determination portion 425, 925.

According to the above-described configuration, the source of the transmission wave that returned as the reception wave is determined in the simple manner in which the first frequencies serving as the frequencies used for transmitting the transmission waves are set for the respective distance detection apparatuses 200, 201, 202, 203, 204 to be different from one another, and thus the correspondence relationship between the frequencies of the transmission wave (the first wave motion) and the reception wave (the second wave motion) is determined.

According to the aforementioned embodiment, in a case where the number of the one or more second frequency obtained as the result of the frequency analysis and the number of the plurality of first frequency do not coincide with each other, the determination portion 425, 925 determines the correspondence relationship between the one or more second frequency and the plural first frequencies on the basis of a blank band X existing at at least one of a low range side and a high range side relative to the one or more second frequency within the range of the predetermined frequency band FB.

According to the above-described configuration, even in a case where the number of the first frequencies and the number of the second frequencies do not match with each other because of, for example, a large degree of transition of the frequency due to the Doppler shift, the correspondence relationship between the first frequency and the second frequency can be determined easily by considering the blank band.

According to the aforementioned embodiment, the object detection system further includes plural distance detection apparatuses 200, 201, 202, 203, 204 (i.e., the second object detection apparatuses). Each of the plural distance detection apparatuses 200, 201, 202, 203, 204 includes the wave transmitter 411 or the transmitting portion 910, 930, 950, the wave receiver 421 or the receiving portion 920, 940, 960, the determination portion 425, 925 and the detection portion 430, 930A, 930B, 930C. The wave transmitter 411 or the transmitting portion 910, 930, 950 of each of the plural distance detection apparatuses 200, 201, 202, 203, 204 is configured to encode the first wave motion such that the first wave motion includes first information as identification information and to transmit the encoded first wave motion as the transmission wave, concurrently and parallelly with the other distance detection apparatuses 200, 201, 202, 203, 204. The wave transmitter 411 or the transmitting portion 910, 930, 950 of each of the plural distance detection apparatuses 200, 201, 202, 203, 204 is configured to encode the first wave motion such that the first wave motion includes, as the identification information, second information which is different from the first information and to transmit the encoded first wave motion as the transmission wave, concurrently and parallelly with the other distance detection apparatuses 200, 201, 202, 203, 204. Each of the plural distance detection apparatuses 200, 201, 202, 203, 204 further includes a correlation processing portion 427 configured to obtain a correlation value corresponding to a degree of similarity of the identification information of the transmission wave and the identification information of the reception wave to each other according to the determination result of the determination portion 425, 925. The detection portion 430, 930A, 930B, 930C of each of the plural distance detection apparatuses 200, 201, 202, 203, 204 is configured to detect the information related to the object O on the basis of a comparison result between the correlation value and a threshold value.

According to the above-described configuration, the determination of a large number of distance detection apparatuses 200, 201, 202, 203, 204 is realized easily by further utilizing the identification information.

According to the aforementioned embodiment, the plural first frequencies are respectively set within ranges of plural bands B1, B2 formed by virtually dividing the predetermined frequency band FB, and the plural bands B1, B2 do not overlap each other.

According to the above-described configuration, the plural first frequencies that differ from each other can be set easily in the method based on the band division.

According to the aforementioned embodiment, the detection portion 430, 930A, 930B, 930C detects, as the information related to the object O, a distance to the object O on the basis of a difference between a timing t0 at which the transmission wave was transmitted and a timing t3 at which the reception wave was received.

According to the above-described configuration, the distance to the object O can be detected easily.

According to the aforementioned embodiment, the object detection system further includes a control portion 220 configured to control a transmission manner in which the wave transmitter 411 or the transmitting portion 910, 930, 950 transmits the transmission wave such that the transmission manner is in either of a first mode and a second mode in accordance with the distance to the object O, the distance to the object O serving as a detection result of the detection portion 430, 930A, 930B, 930C. The first wave motion is transmitted as the transmission wave in the first mode, and a third wave motion of a third frequency which is in a vicinity of a center frequency fc of the predetermined frequency band FB is transmitted as the transmission wave.

According to the above-described configuration, the first mode and the second mode can be switched with each other depending on the circumstances. In the first mode, only the band that corresponds to part of the predetermined frequency band FB is used. In the second mode, the band that is in the predetermined frequency band FB and is in the vicinity of the center frequency fc where the power is outputted efficiently is used.

According to the aforementioned embodiment, the wave transmitter 411 or the transmitting portion 910, 930, 950 and the wave receiver 421 or the receiving portion 920, 940, 960 of each of the plural distance detection apparatuses 200, 201, 202, 203, 204 are configured integrally with each other to serve as a transmitting and receiving portion 210 including a single vibrator 211 configured to transmit and receive an ultrasonic wave, and the predetermined frequency band FB is set according to specifications of the vibrator 211.

According to the above-described configuration, the configuration for transmitting and receiving the transmission wave and the receiving wave can be simplified, and the predetermined frequency band FB can be set easily.

According to the aforementioned embodiment, a distance detection apparatus 200, 201, 202, 203, 204 (i.e., an object detection apparatus) configured to transmit and receive a wave motion of a frequency included in a predetermined frequency band FB, the apparatus includes a wave transmitter 411 or a transmitting portion 910, 930, 950 which are configured to transmit, as a transmission wave, a first wave motion of which a signal level reaches a peak at one of plural first frequencies, the plural first frequencies being included in a range of the predetermined frequency band FB and set respectively for plural distance detection apparatuses 200, 201, 202, 203, 204, the plural distance detection apparatuses 200, 201, 202, 203, 204 including the distance detection apparatus 200, 201, 202, 203, 204 and the other distance detection apparatus 200, 201, 202, 203, 204. The distance detection apparatus 200, 201, 202, 203, 204 includes a wave receiver 421 or a receiving portion 920, 940, 960 which are configured to receive a reception wave that is based on the transmission wave returned due to reflection at an object O, and a determination portion 425, 925 configured to determine a second frequency at which a signal level of a second wave motion reaches a peak, the second wave motion being included in the reception wave and serving as a wave motion corresponding to the first wave motion, the determination portion determining the second frequency on the basis of a result of a frequency analysis performed on the reception wave and information related to the plurality of first frequencies. The distance detection apparatus 200, 201, 202, 203, 204 includes a detection portion 430, 930A, 930B, 930C configured to detect information related to the object O on the basis of information obtained according to a determination result of the determination portion 425, 925.

According to the above-described configuration, in a case where the plural object detection apparatuses 200, 201, 202, 203, 204 each including the same configuration exist, the source of the transmission wave returned as the reception wave is determined in the simple method in which the first frequencies used to transmit the transmission waves are made different from each other so that the plural object detection apparatuses 200, 201, 202, 203, 204 include the different first frequencies from each other, and accordingly the correspondence relationship between the transmission wave (the first wave motion) and the reception wave (the second wave motion) is determined.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An object detection system comprising:
    a plurality of first object detection apparatuses;
        each of the plurality of first object detection apparatuses including;
        a transmitting portion configured to transmit, as a transmission wave, a first wave motion of a first frequency included in a plurality of first frequencies set within a range of a predetermined frequency band, the transmitting portion transmitting the first wave motion of the first frequency which is different from the other first object detection apparatus concurrently with the other first object detection apparatus;
        a receiving portion configured to receive a reception wave that is based on the transmission wave returned due to reflection at an object;
        a determination portion configured to determine a correspondence relationship between one or more second frequency of one or more second wave motion included in the reception wave and the plurality of first frequencies, on the basis of a result of a frequency analysis of the reception wave and information related to the plurality of first frequencies; and
        a detection portion configured to detect information related to the object on the basis of information obtained according to a determination result of the determination portion; and
    a plurality of second object detection apparatuses, each of the plurality of second object detection apparatuses including the transmitting portion, the receiving portion, the determination portion and the detection portion, wherein
    the transmitting portion of each of the plurality of first object detection apparatuses is configured to encode the first wave motion such that the first wave motion includes first information as identification information and to transmit the encoded first wave motion as the transmission wave, concurrently and parallelly with the other first object detection apparatus and the plurality of second object detection apparatuses,
    the transmitting portion of each of the plurality of second object detection apparatuses is configured to encode the first wave motion such that the first wave motion includes, as the identification information, second information which is different from the first information and to transmit the encoded first wave motion as the transmission wave, concurrently and parallelly with the other second object detection apparatus and the plurality of first object detection apparatuses,
    each of the plurality of first object detection apparatuses and the plurality of second object detection apparatuses further includes a correlation processing portion configured to obtain a correlation value corresponding to a degree of similarity of the identification information of the transmission wave and the identification information of the reception wave to each other according to the determination result of the determination portion, and
    the detection portion of each of the plurality of first object detection apparatuses and the plurality of second object detection apparatuses is configured to detect the information related to the object on the basis of a comparison result between the correlation value and a threshold value.

2. The object detection system according to claim 1, wherein in a case where a number of the one or more second frequency obtained as the result of the frequency analysis and a number of the plurality of first frequency do not coincide with each other, the determination portion determines the correspondence relationship between the one or more second frequency and the plurality of first frequencies on the basis of a blank band existing at at least one of a low range side and a high range side relative to the one or more second frequency within the range of the predetermined frequency band.

3. The object detection system according to claim 1, wherein the plurality of first frequencies are respectively set within ranges of a plurality of bands formed by virtually dividing the predetermined frequency band, and the plurality of bands do not overlap each other.

4. The object detection system according to claim 2, wherein the plurality of first frequencies are respectively set within ranges of a plurality of bands formed by virtually dividing the predetermined frequency band, and the plurality of bands do not overlap each other.

5. The object detection system according to claim 1, wherein the plurality of first frequencies are respectively set within ranges of a plurality of bands formed by virtually dividing the predetermined frequency band, and the plurality of bands do not overlap each other.

6. The object detection system according to claim 1, wherein the detection portion detects, as the information related to the object, a distance to the object on the basis of a difference between a timing at which the transmission wave was transmitted and a timing at which the reception wave was received.

7. The object detection system according to claim 6, further comprising:
    a control portion configured to control a transmission manner in which the transmitting portion transmits the transmission wave such that the transmission manner is in either of a first mode and a second mode in accordance with the distance to the object, the distance to the object serving as a detection result of the detection portion, the first wave motion being transmitted as the transmission wave in the first mode, and a third wave motion of a third frequency which is in a vicinity of a center frequency of the predetermined frequency band being transmitted as the transmission wave.

8. The object detection system according to claim 1, wherein
    the transmitting portion and the receiving portion of each of the plurality of first object detection apparatuses are configured integrally with each other to serve as a transmitting and receiving portion including a single vibrator configured to transmit and receive an ultrasonic wave, and the predetermined frequency band is set according to specifications of the vibrator.

* * * * *